United States Patent [19]

Von Grunberg et al.

[11] 3,788,710

[45] Jan. 29, 1974

[54] ANTISKID CONTROL SYSTEM

[75] Inventors: Hubertus Von Grunberg, Niederhochstadt; Werner Fink; Dieter Kircher, both of Frankfurt, all of Germany

[73] Assignee: ITT Industries, Inc., New York, N.Y.

[22] Filed: Aug. 21, 1972

[21] Appl. No.: 282,532

[30] Foreign Application Priority Data

Aug. 25, 1971 Germany.........................2142552

[52] U.S. Cl. ............................ 303/21 F, 303/21 AF
[51] Int. Cl................................................ B60t 8/04
[58] Field of Search .......... 303/21 F, 21 AF, 68–69, 303/61–63, 10, 21 R, 21 A, 21 CG; 188/181

[56] References Cited
UNITED STATES PATENTS

| | | | |
|---|---|---|---|
| 3,556,615 | 1/1971 | Stelzer | 303/21 F |
| 3,610,702 | 10/1971 | MacDuff | 303/21 F |
| 3,682,513 | 8/1972 | Oberthur | 303/21 F |

FOREIGN PATENTS OR APPLICATIONS

| | | | |
|---|---|---|---|
| 1,947,012 | 3/1971 | Germany | 303/21 AF |

*Primary Examiner*—Duane A. Reger
*Assistant Examiner*—D. C. Butler
*Attorney, Agent, or Firm*—John T. O'Halloran; Menotti J. Lombardi, Jr.; Alfred C. Hill

[57] ABSTRACT

There is disclosed herein a plurality of hydraulically controlled separating valves, one for each vehicle wheel, of an antiskid control system. Each of the separating valves separates its associated wheel brake cylinder from the master cylinder when an electronic control system responsive to wheel speed sensors produces a first control value indicative of wheel skid and reconnects its associated wheel brake cylinder with the master cylinder when a further control value indicative of a given wheel reacceleration is produced by the electronic control system. A volume expansion arrangement is also provided for each of the separating valves to enable reacceleration of the wheels. All of the plurality of separating valves and volume expansion arrangements are arranged compactly in one single housing and the separating valves are maintained open by a primary control force, such as accumulator or pump pressure, the primary control force being controlled by the control valves to provide antiskid control. Should the primary control force be lost a single auxiliary force contained in the housing will operate on all the volume expansion arrangements and/or separating valves to maintain the separating valves in their open position so that the brake system is operative even though the antiskid control system is rendered inoperative. A mechanical and a hydraulic auxiliary force arrangement is disclosed.

43 Claims, 6 Drawing Figures

ANTISKID CONTROL SYSTEM

BACKGROUND OF THE INVENTION

The present invention relates to a device for antiskid control systems in which the hydraulic connecting line between wheel brake cylinder and actuating or master cylinder is interrupted by a separating valve dependent upon a first control value derived from the wheel speed, which interrupts a primary control force, in which the brake medium in the section connected with the brake cylinder expands by means of volume expansion upon the hydraulically controlled movement of a piston when the primary force is interrupted, in which the wheel brake cylinder is newly applied with brake pressure upon occurrence of a further control value derived from the wheel speed which reapplies the primary control force, and in which an auxiliary force keeps the system in a state ready for braking upon a break-down of the primary control force.

Devices of the kind mentioned hereinabove are known. In a known embodiment of an antiskid control unit based on this principle the movement of the piston causing the volume expansion is connected mechanically to that of the separating valve. The piston is moved by controlled pressure, which acts on a diaphragm connected with the piston, against the high prestress force of a spring which supports itself on the diaphragm on one end and on the housing bottom on the other end, and which also generates the return force to return the piston to its normal position.

The assembly of such strongly prestressed springs — in the described case the spring must have a prestress force which exceeds the force of the brake pressure acting on the piston surface — always has disadvantages. Furthermore, when the spring is designed there has to be taken into consideration that the spring must be used only in the linear range of its spring characteristics. If the spring is used in its non-linear spring characteristic, the volume expansion in the brake circuit is no longer analogous to the control value.

In the all-wheel control generally aimed at in a vehicle a plunger unit with a separating valve is to be inserted in each pressure medium line leading to the wheel brake cylinders so that the whole antiskid control system including the spring-pot units provided at each plunger unit require much precious space for assembly.

It has already been suggested to control the plunger of the plunger unit hydrodynamically in both directions of the movement, e.g., by applying and cutting off an accumulator pressure on both sides of the plunger. But even then for security reasons an emergency spring is not dispensable because the brake system has to remain operative even upon a break-down of the accumulator pressure which keeps the plunger in its initial position.

The German Pat. No. 1,940,248 suggests an antiskid control system with a purely hydraulically controlled plunger. The control plunger applied to the actuating surface of this plunger is controlled by way valves actuated electromagnetically dependent upon the control value, said way valves serving as inlet and outlet valves. Upon a break-down of the accumulator pressure a locking device, which is also dependent on the accumulator pressure and actuated in opposite direction by an auxiliary force, keeps the outlet valve closed, the inlet being secured by a non-return valve. The effect of the control unit is then neutralized, but the brake system as such is still ready for operation. This locking device, however, has to be provided for each outlet valve provided in the system. The absolute security must be doubted. Upon a break-down of the accumulator pressure, this locking device retains the plunger in the position which it occupies at the moment. If the accumulator pressure breaks down during a control action and the plunger is in the retracted state, the volume expansion of the brake circuit remains inspite of the locking device 30 that the functioning of the brake system is earnestly questioned.

The French Pat. No. PS 2,030,813 describes a system in which the section of the brake line of a wheel to be separated hydraulically by a separating valve from the master cylinder is connected with a first cylinder chamber in which a plunger is moved. The plunger in its normal position keeps the separating valve lifted off from its seat via a projection. A second cylinder chamber is separated by a partition wall from this first cylinder chamber and a piston loaded by an emergency return spring supporting itself on the bottom is arranged in the second cylinder chamber. A projection of this piston projects in a sealed slidable relation through the partition wall into the first cylinder chamber. The second cylinder chamber is connected to a pump or an accumulator, respectively, such that the piston is retained against the force of the emergency return spring by means of the hydraulic pressure acting on its annular surface. The part of the first cylinder chamber separated from the brake circuit by means of the plunger is also connected to the accumulator or the reservoir via a return line alternately during a control cycle dependent upon control value determined by the state of motion or speed of the wheel. In the normal case, the surface of the plunger disposed away from the brake circuit is applied with the accumulator pressure, the plunger is kept in its normal position and the separating valve is kept lifted off from its seat so that the pressure can be built up in the wheel brake cylinder from the master cylinder. If there is a danger that the wheel locks, a control action or cycle is initiated. An actuating signal is generated depending on the changing control value and the actuating signal separates the part of the first cylinder chamber separated from the brake circuit from the accumulator and connects it with the reservoir. The brake pressure acting on the surface of the plunger facing the brake circuit moves the plunger into the cylinder and, in doing so, also closes the separating valve. The volume of the section of the brake circuit connected with the wheel brake cylinder expands by the displacement of the plunger which is mainly proportional to the switching time of the valves, and the brake medium can expand. The wheel having again reached a certain velocity, the first cylinder chamber is again connected to the accumulator and the normal state is reestablished.

During the whole operation described above the piston arranged in the second cylinder chamber remains in its position prestressed against the emergency return spring. Upon a break-down of the accumulator pressure the emergency return spring moves this piston upwards so that its projection projecting into the first cylinder chamber comes to abut the bottom of the plunger and in each a case keeps the plunger in its normal position against the brake pressure and keeps the separating valve lifted off from its seat. In this system the brake control system fails upon a break-down of the accumulator pressure, but the brake circuit itself is kept operative. As can be seen, however, even with this device a strong return spring could not be dispensed with in each of the plunger units. Even this return spring, which comes into effect only in case of an emergency, must be able to overcome the force of the brake pressure on the plunger.

In a vehicle provided with an all-wheel control the arrangement of several — up to eight — strong return springs on all existing plunger units causes difficulties because of the great space demand and the high costs.

SUMMARY OF THE INVENTION

An object of the present invention is to provide an arrangement for antiskid control systems with independent control at all vehicle wheels in which a plurality of return springs in the whole system can be dispensed with resulting in space-saving and low costs.

A feature of the present invention is to provide in an antiskid control system having an electronic control arrangement responsive to vehicle wheel speed to produce a first control value indicative of wheel skid and a further control value indicative of a given reacceleration of vehicle wheels, a control valve arrangement comprising: a plurality of wheel brake cylinders; a plurality of separating valves, each of the separating valves being disposed between the master cylinder and an associated one of the wheel brake cylinders; first means coupled to each of the separating valves to provide a primary control force for each of the separating valves, the primary control force normally holding each of the separating valves in their open position, the first control value interrupting the primary control force causing each of the separating valves to close and thereby interrupt the hydraulic connection between the master cylinder and the associated one of the wheel brake cylinders, and the further control value reapplying the primary control force causing each of the separating valves to open and thereby reestablish the hydraulic connection between the master cylinder and the associated one of the wheel brake cylinders; a plurality of second means combined in one part with or separated from said first means each associated with a different one of the separating valves to enable volume expansion of the pressure medium in the associated one of the wheel brake cylinders when the separating valves are closed to enable reacceleration of the vehicle wheels; a single housing having the plurality of separating valves and the plurality of second means disposed therein compactly; and a single auxiliary force source disposed in the housing in a cooperative association with each of the separating valves to maintain each of the separating valves in their open position upon failure of the primary control force.

In one embodiment of purely mechanically operating auxiliary force is provided upon a break-down of the primary control force.

In another embodiment a hydraulically operable auxiliary force is provided in case of a break-down of the primary control force.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
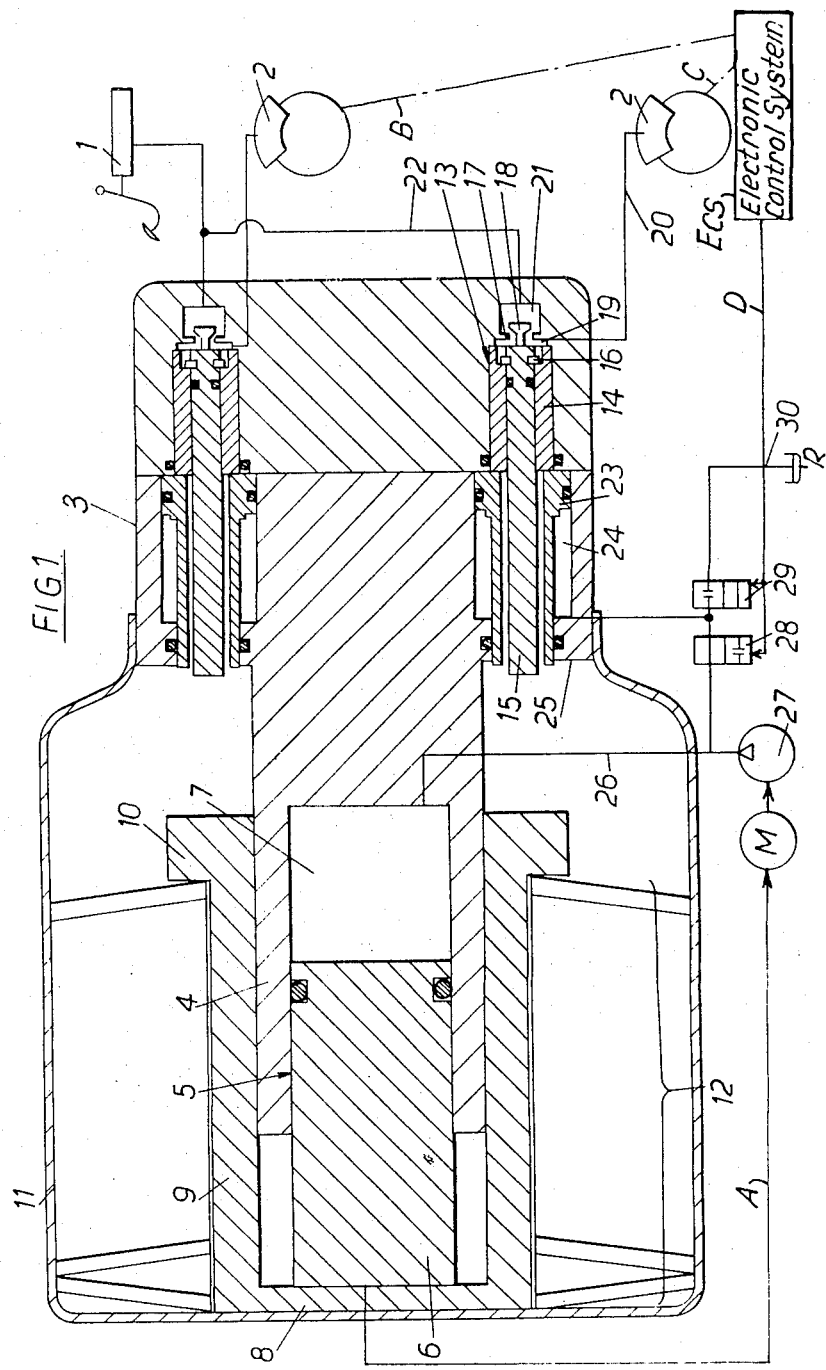
FIG. 1 shows a first embodiment of the control valve arrangement in accordance with the principles of the present invention in normal position.
Figure 2:
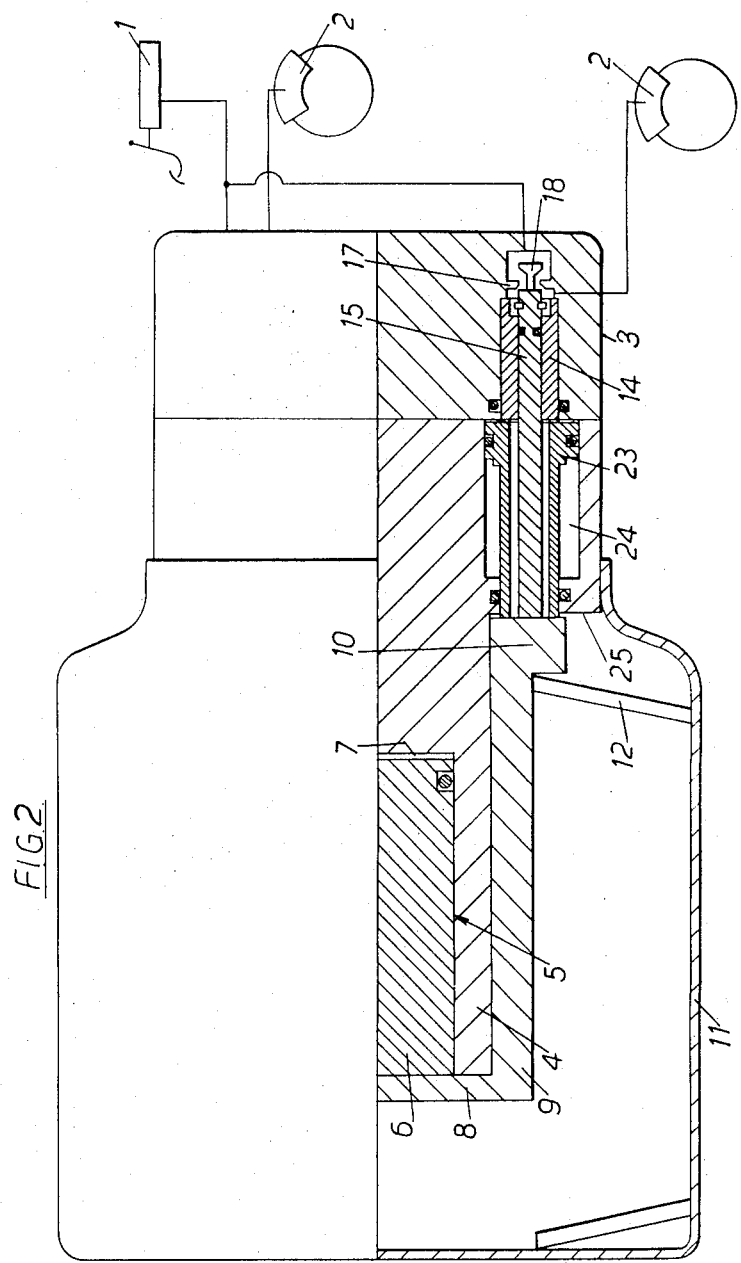
FIG. 2 shows the embodiment of FIG. 1 upon failure of the accumulator pressure.

Referring to FIGS. 1 and 2, according to the invention all plunger units provided in the pressure medium connections from the master cylinder 1 to the wheel brake cylinder of individual wheel brakes 2 of an all-wheel controlled brake system are integrated in a compact unit. The housing 3 of this arrangement has a central projection 4 in which a cylindrical recess 5 is provided. An accumulator piston 6 is arranged displaceably and sealed against the inner wall of cylindrical recess 5. The space confined by the recess wall and accumulator piston 6 serves — as is described below — as pressure accumulator 7, and is connected to a pump 27 via pressure medium connection 26. The motor M of pump 27 is controllable via central accumulator piston 6 as indicated by line A. Line A is merely illustrated to indicate in the sense of a block diagram that motor M is controllable in any well known manner obvious to those ordinarily skilled in the art by the position of piston 6 to render motor M operative during the time the antiskid system is inoperative and to render motor M inoperative when the antiskid system is operative. One immediate implementation of how motor M is controlled that will come to the mind of those ordinarily skilled in the art is to provide a switch (not shown) in bottom 8 whose opened and closed position is controlled by the position of piston 6. The switch will be closed when piston 6 is in the position illustrated (antiskid system inoperative) and will be opened when piston 6 moves away from bottom 8 (antiskid system operative). The switch would be connected to two conductors that are connected to the voltage source that operates motor M so that the switch appropriately controls the connection of the operating voltage to motor M in response to the position of piston 6. A second obvious implementation to control the motor M by the position of piston 6 is to provide a pressure sensitive switch in motor M in the operating voltage path thereof and a pressure coupling connection between accumulator 7 and the pressure sensitive switch. Thus, when piston 6 is in the position illustrated the pressure of accumulator 7 will be high (antiskid system inoperative) and will close the pressure sensitive switch connecting the operating voltage to motor M to operate motor M. However, when pressure decreases in accumulator 7 and piston 6 is enabled to move away from bottom 8 due to operation of the antiskid system, the pressure sensitive switch will open, remove operating voltage from motor M and thereby stop motor M. As is apparent from this second implementation for control of motor M, the actual physical connection required is between accumulator 7 and motor M. However, since the pressure in accumulator 7 controls the position of piston 6 the block diagram representation of line A is still correct since the position of piston 6 is the influencing factor for control of motor M.

Accumulator piston 6 projecting from cylindrical recess 5 rests on the bottom 8 of the sleeve 9 surrounding projection 4 and displaceable on the outer surface of projection 4. A radially outwards extending collar 10 is provided at the open end of sleeve 9. A concentrically arranged spring package 12 supports itself on the annular surface of collar 10 and on the bottom of the cup-shaped spring-pot 11 which closes off the entire unit. The open end of spring-pot 11 is secured to housing 3. All plunger units of the antiskid control system of the brake system are arranged concentrically of and parallel with respect to the longitudinal axis of housing 3 in an annular area spaced radially outwards from said longitudinal axis. In one device up to six plunger units are provided with an all-wheel control and two-circuit braked front axle. For each of these plunger units a cylinder bore 13 is provided in the radially outwards annular area of housing 3, the plunger being arranged slideably sealed against the inner wall of bore 13. The plunger consists of two parts for reasons which are explained below. The two parts are a short sleeve 14 and a longer push rod 15 displaceable or slidable in sleeve 14 and sealed against the inner wall thereof. The displaceability of push rod 15 within sleeve 14 in one direction is limited by an annular-shaped abutment 16 on push rod 15 which cooperates with a small step on the inner surface of sleeve 14. The displaceability of push rod 15 in the other direction is limited by a radially inwards extending collar 17 on the inner surface of bore 13. Sleeve 14 abuts, in the same direction, a small step on the inner surface of bore 13. Collar 17 serves as a valve seat for a valve closing member 18 actuated by push rod 15.

The chamber 19 of bore 13 limited in one direction by the front surface of push rod 15 and the annular surface of sleeve 14 is connected with the wheel brake cylinders of a wheel brake 2 by a pressure medium line 20. The chamber 21 of bore 13 lying on the other side of the seat valve 17, 18 is connected to master brake cylinder 1 by means of a pressure medium line 22.

In the place where sleeve 14 of the plunger ends in bore 13, bore 13 first is expanded in diameter by a step and then reduced to its old diameter shortly before the open end of bore 13. A control sleeve 23 stepped correspondingly on its outside circumference is introduced in this area of bore 13 and is slidably sealed against the inner surface of bore 13. The step on control sleeve 23 is such that an elongated annular chamber 24 is created between the inner surface of the expanded bore 13 and the outer surface of control sleeve 23 reduced as regards its outside diameter. The annular surface of control sleeve 23 facing sleeve 14 of the plunger rests on the annular surface of the sleeve 14. Push rod 15 projects through control sleeve 23 with play and surpasses by a small extent the annular surface 25 of housing 3, said annular surface 25 being generated by the design of central projection 4. The annular chamber 24 between the wall of the expanded bore 13 and stepped control sleeve 23 is connected via an inlet valve 28, open in rest position, with the pump 27, or pressure accumulator 7 disposed centrally in projection 4 of housing 3. Annular chamber 24 is connected with the return line 30 via an outlet valve 29, closed in rest position. Line 30 is connected to a reservoir R.

All plunger units provided in housing 3 preferably concentrically of its axis, and their pressure medium connections are disposed in the above described manner. For assembly, housing 3 is bipartite in the plane in which sleeves 23 rest with their front surfaces on sleeves 14 of the plunger units, or the steps of bores 13.

The operation of the device is as follows:

In normal position pump 27 is connected via pressure medium line 26 to pressure accumulator 7 lying centrally in housing 3. By means of the pressure in pressure accumulator 7, accumulator piston 6 and sleeve 9 surrounding it and closed by bottom 8 are kept in abutment on the bottom of the spring-pot 11, and the spring package supporting itself on the bottom of the spring-pot 11 and collar 10 of sleeve 9 is kept under stress.

The pump 27 and pressure accumulator 7 are further connected with annular chamber 24 of the different plunger units via inlet valve 28 opened in rest position so that stepped control sleeve 23 is kept in abutment at the annular surface of sleeve 14 facing control sleeve 23. Sleeve 14 and push rod 15 which together form the plunger are thus kept in initial position, and the separating valve 17, 18 is kept open. Pressure in wheel brake cylinders of the brakes 2 can be built up only from the master cylinder 1 via pressure medium line, e.g., lines 22 and 20, by means of the opened separating valve 17, 18. If there is the danger that a wheel locks signals indicating this state are generated in electronic control system ECS which is coupled to the wheels by speed or acceleration sensors represented by lines B and C. System ECS may take any of the forms well known in the prior art. The wheel lock signal is coupled from systems ECS over line D to actuate inlet valve 28 and outlet valve 29 of the respective wheels. Thus, annular chamber 24 is separated from the pressure medium source and connected to return line 30 so that the pressure can expand in annular chamber 24. By means of the brake pressure from master cylinder 1 acting on the front surfaces of sleeve 14 and push rod 15, the whole plunger unit — consisting of sleeve 14, push rod 15, and stepped control sleeve 23 — moves out of bore 13. Valve closing member 18 will then be able to rest on its valve seat 17 by the action of the brake pressure and, thus, separates section 22 of the brake line connected with master cylinder 1 from section 20 of the brake line connected with wheel brake cylinders of wheel brakes 2. By the movement of the whole plunger unit, chamber 19 lying before the whole plunger unit and closed by separating valve 17, 18 is increased as is the section 20 of the brake line leading from this chamber 19 to wheel brake cylinders 2 so that the effective brake pressure will drop. As soon as the wheel has regained a certain state of motion or reacceleration outlet valve 29 and inlet valve 28 are switched back to their normal position by a control valve generated in system ECS indicative of this condition. Then the whole plunger unit returns to its initial position by the pressure building up in annular chamber 24 and separating valve 17, 18 is also reopened by push rod 15 to its normal open position so that a new braking can be initiated.

Upon a break-down of the accumulator or pump pressure, spring package 12 moves sleeve 9, closed by bottom 8, towards annular surface 25 of housing 3 and moves accumulator piston 6 into cylindrical recess 5. As is illustrated in FIG. 2 the front surface of collar 10 abuts annular surface 25 and the plunger units so that the plunger units are kept in their initial position against the brake pressure and separating valves 17, 18 are kept open. Thus, upon a break-down of the accumulator or pump pressure the brake pressure built up by the driver is prevented from displacing the plunger units and closing the separating valves which would put the whole brake system out of operation. In this position no antiskid control is possible, but a normal braking can be effected.

If the plunger unit each consisted of a one-piece plunger and of a control sleeve only it could happen — due to the manufacturing tolerances — that not all plungers would be kept in their rest position by the abutment of sleeve 9 against surface 25. For instance, one or more separating valves would nevertheless be closed by the brake pressure and the braking of the associated wheel would fail. Therefore, each plunger — as mentioned above — is made of two components, sleeve 14 and push rod 15 displaceable in sleeve 14 with push rod 15 actuating separating valve 17, 18. By the fact that all these push rods 15 surpass annular surface 25 of the housing 3 by a small extent, it is safeguarded that upon a break-down of the accumulator or pump pressure all separating valves 17, 18 are reopened, without the closing distances of the separating valves being increased when in operation.

A further particularly space-saving embodiment of the invention is described in the following with reference to FIGS. 3 and 4.

Figure 3:
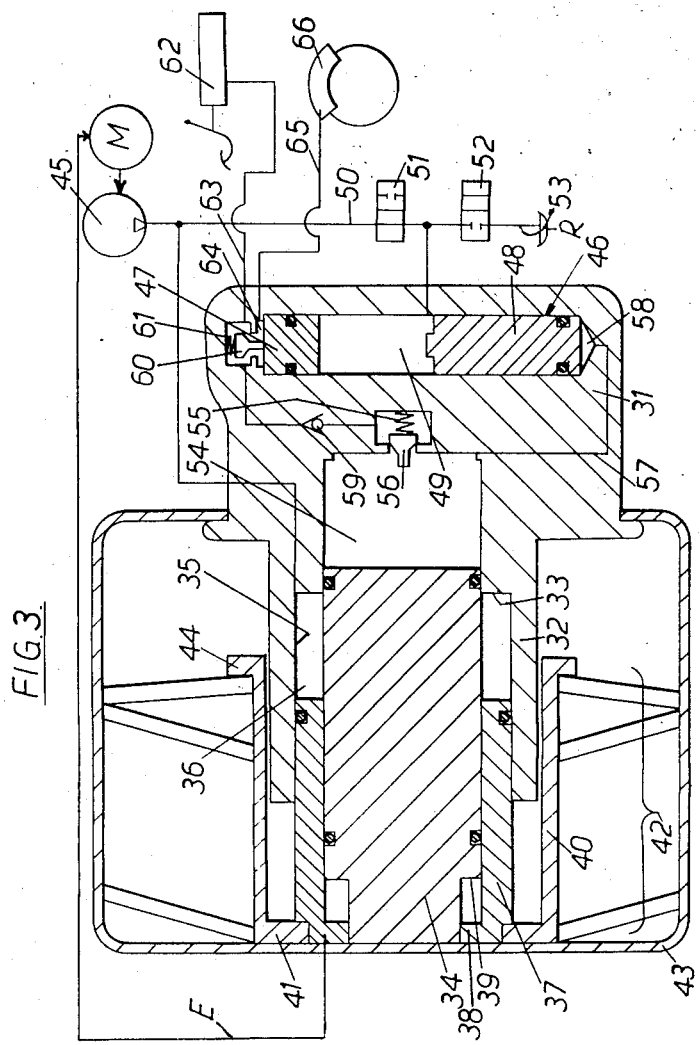
FIG. 3 shows a second embodiment of the control valve arrangement in accordance with the principles of the present invention in normal position.
Figure 4:
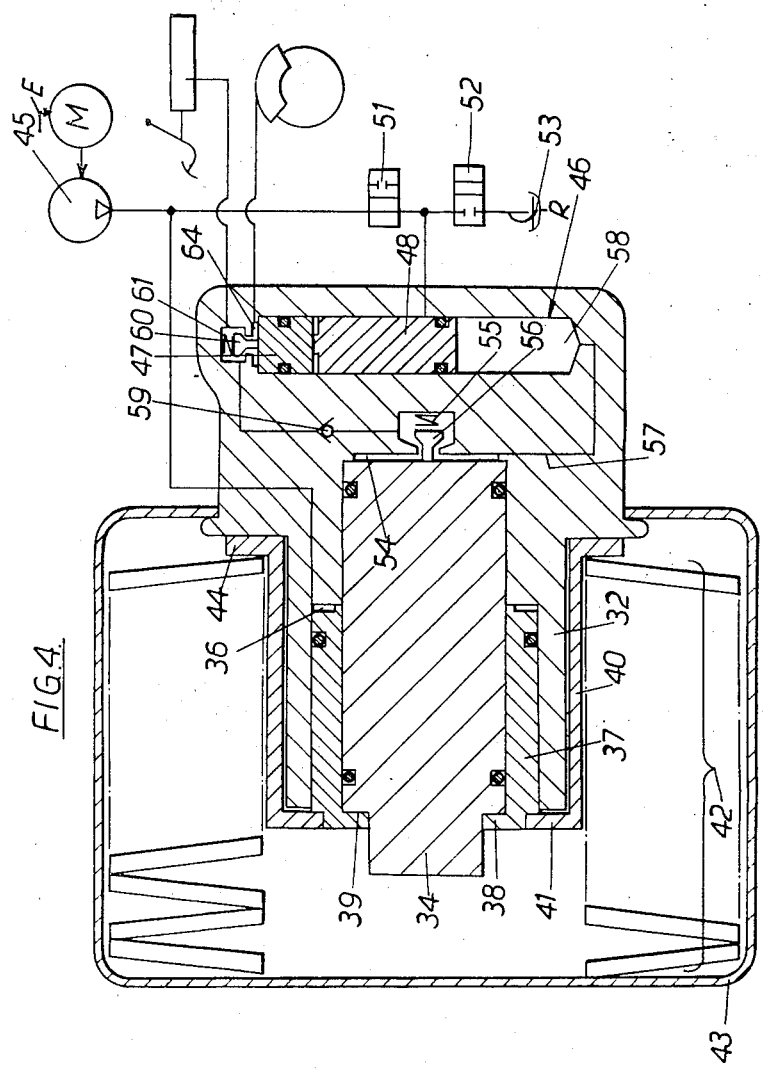
FIG. 4 shows the embodiment of FIG. 3 upon a break-down of the accumulator pressure.

FIG. 3 shows the arrangement in an intact state and in its initial position.

A housing 31 has a central hollow cylindrical projection 32. The hollow projection 32 forms a recess having an inner wall including a step 33. A piston 34 is arranged slidably sealed against the inner surface of the smaller diameter portion of the recess and projects therefrom. An annular piston 37 is inserted in a slidable sealed relation in the annular chamber 36 remaining between piston 34 and cylinder wall 35 of the recess. An inwardly extending collar 38 is provided at the end of annular piston 37 to engage a corresponding step 39 disposed on piston 34. A sleeve 40 slides on the surface of projection 32. Sleeve 40 includes an inwardly extending collar 41 engaging an annular groove in the outer surface of annular piston 37.

A spring package 42 is disposed concentrically of sleeve 40. Spring package 42 has one end resting on the bottom of a spring-pot 43 mounted or otherwise secured to housing 31. The other end of spring package 42 is supported on a radially outward extending collar 44 of sleeve 40. Annular chamber 36 is connected with a pump 45 driven by an electric motor M and serves as a pressure accumulator. Electric motor M is controllable by annular piston 37 indicated by line E substantially as described hereinabove with respect to piston 6 and line A of FIG. 1.

In the part of housing 31 lying before projection 32, cylinder bores 46 are provided preferably in parallel in one plane and vertically disposed with respect to the axis of housing 31. Their number corresponds to the number of pressure modulators required for an antiskid control in the brake system. A plunger 47 and a counter-piston 48 are arranged slidably sealed against the inner cylindrical wall in each of these bores 46. The chamber 49 between these plunger 47 and piston 48 is connected with pump 45 by a pressure medium line 50 and an inlet valve 51 opened in rest position. The pressure in chamber 49 keeps plunger 47 and piston 48 at a distance, or in abutment with opposite ends of bore 46. The chamber 49 is further connected to the return line 53 and reservoir R via an outlet valve 52 closed in rest position. A small chamber 55 is disposed in housing 31 before space 54 limited by piston 34 in the recess of projection 32. Chamber 55 and space 54 are separated from each other by a seat valve 56 closing in the direction of space 54. The space 54 is connected with chamber 58 formed by one end of bore 46 and the adjacent end surface of counter-piston 48. Via a non-return valve 59 opening in the direction of chamber 55 a pressure medium line leads from chamber 55 into one of the chambers 61, separated by means of separating valves 60, of the plurality of bores 46. Furthermore, section 63 of the brake line connected with the master cylinder 62 opens into each of these chambers 61. The section 65 of the brake line leads from chamber 64 of the cylinder bores 46, lying on the other side of separating valve 60, to the wheel brake cylinders of individual wheel brakes 66. Chamber 64 is formed by the seat of separating valve 60 and the adjacent end surface of plunger 47.

The arrangement operates as follows:

FIG. 3 shows the ready-for-operation state. The accumulator pressure is generated in annular chamber 36 by means of the pump 45. The accumulator pressure keeps annular piston 37 and sleeve 40 in abutment on the bottom of spring-pot 43 thereby keeping spring package 42 under pressure. There is also accumulator pressure in chamber 49 of bore 46 so that plunger 47 and counter-piston 48 are kept at a distance. Separating valve 60 is lifted off from its seat and thus kept in opened position by plunger 47 which is in abutment with valve 60. Low pressure prevails at first in space 54, chamber 55, chamber 58 of bore 46 and the brake line. In this state the brake pressure can be built up from master cylinder 62 in wheel brake 66 by section 63 of the brake line, the opened separating valve 60 and the section 65 of the brake line. The accumulator pressure in chamber 49 keeps plunger 47 in its initial position against the brake pressure. At the same time brake pressure is built up via non-return valve 59 from the individual chambers 61 in chamber 55 by connecting line provided only once for one brake circuit. This brake pressure closes seat valve 56 to space 54. Space 54 and chamber 58 of all bores 46 remain under low pressure. If one of the wheels comes into a critical deceleration state by excessive deceleration inlet valve 51 and outlet valve 52 of the respective unit are brought into switched position by corresponding actuating signals from a known electronic control system such as shown in FIG. 1. Chamber 49 of bore 46 is separated from pump 45 and the pressure medium expands into return line 53 through outlet valve 52. As a consequence, the brake pressure acting on the front surface of plunger 47 can displace said plunger in bore 46. This will permit separating valve 60 to close and chamber 64 of bore 46, which is connected with the wheel brake, to increase in volume so that the pressure in the wheel brake 66 is reduced and the wheel can reaccelerate. As soon as the respective wheel has reached a certain state of motion inlet valve 51 and outlet valve 52 are switched back into their rest position, pressure is built up again in chamber 49 which will bring plunger 47 back into its initial position against the brake pressure thereby reopening separating valve 60 so that a new braking can be initiated.

Upon a break-down of the accumulator pressure or the pump 45 plunger 47 must be prevented from being displaced in each case by the brake pressure so that master cylinder 62 is not separated from the wheel brake 66 by separating valve 60 which would prevent any braking.

In the device described above the tense spring package 42 moves sleeve 40 upon a break-down of pump 45, or the accumulator pressure. Sleeve 40 carries along with it annular piston 37 by the above described engagement of these two elements. Annular piston 37 will move into annular chamber 36 which is now without pressure. After a short movement of annular piston 37 its collar 38 abuts the annular surface of step 39 of central piston 34 so that it is also carried along by the movement of sleeve 40 until finally piston 34 abuts the bottom of space 54 (see FIG. 4). Upon the movement of piston 34 under the force of spring package 42 the pressure increases in the space 54 and also in all chambers 58 of bores 46 so that counter-pistons 48 are moved towards plunger 47, and plungers 47 are kept in abutment with separating valves 60 so as to maintain them in their open or rest position to permit a normal braking, although without antiskid control.

In the operation described above it can happen — as a consequence of small pressure medium losses in space 54 — that not all plungers 47 abut their associated separating valve 60 and these separating valves 60 will remain closed. Upon a subsequent braking chambers 64 of bores 46 are at first pressureless. But by means of the pressure medium line with non-return valve 59 provided only once, through chamber 55, opened seat valve 56 and pressure medium line 57 the brake pressure can reach the actuating surfaces of counter-piston 48 so that these remaining separating valves 60, too are opened by the respective plunger 47.

Non-return valve 59 and the corresponding pressure medium connection with chamber 55 is provided only once. In the case of a two-circuit brake system non-return valve 59 safeguards the functioning of the remaining brake circuit upon a simultaneous break-down of the accumulator pressure and one brake circuit.

Figure 5A:
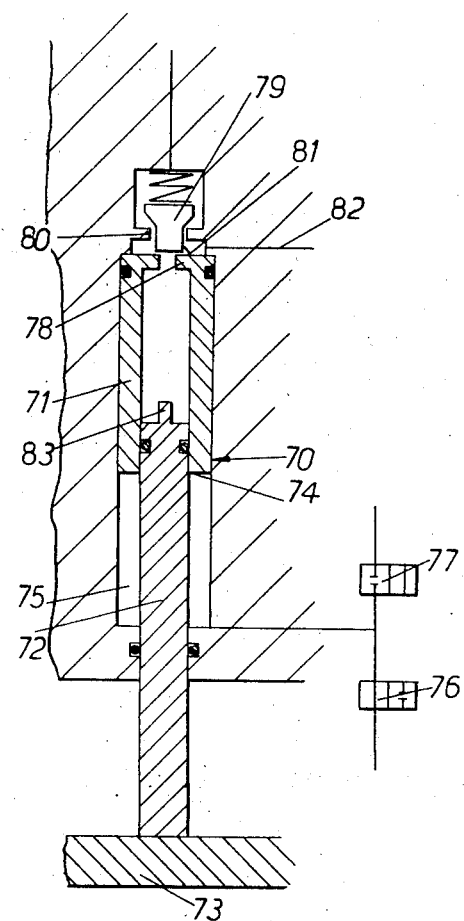
FIGS. 5a and 5b show a special embodiment of the plunger unit with a separating valve.
Figure 5B:
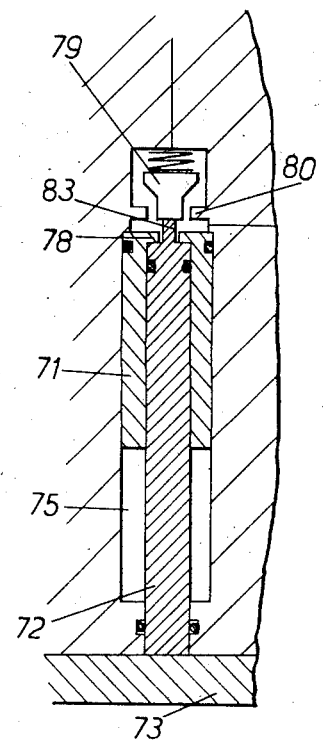

The FIGS. 5a and 5b show a special embodiment of the plunger unit as is applicable in a system according to FIGS. 1 and 2. FIG. 5a shows the normal state with intact accumulator pressure and FIG. 5b shows the state upon a failure of the accumulator pressure.

The plunger slidably sealed in the cylinder bore here comprises the sleeve 71 only. A push rod 72 projects into sleeve 71. Push rod 72 is slidably sealed against the inner wall of sleeve 71 and also at the passage in the housing. Push rod 72 rests on a pressure plate 73 with its end projecting from the bore, a spring package pre-stressed by the accumulator pressure supporting itself on pressure plate 73. Push rod 71 has a central projection 83 at its end lying within sleeve 71. An annular chamber 75 limited by the annular surface 74 of sleeve 71 exists between the bore wall and the surface of push rod 72. Annular chamber 75 is connected with the pressure accumulator via an inlet valve 76 opened in rest position and with the return line via an outlet valve 77 closed in rest position. Due to the action of the accumulator pressure in annular chamber 75 acting on annular surface 74 of sleeve 71, the end of sleeve 71 facing the brake circuit rests against an abutment in bore 70. Sleeve 71 keeps the closing member 79 of the separating valve lifted off from its seat 80 via a radially inward extending collar 78 so that both sections of the brake line are connected with each other. The front surface of push rod 72 lying within sleeve 71 is actuable by the brake pressure and, thus, is brought into a retracted initial position preferably in abutment with pressure plate 73.

If upon a danger of wheel locking annular chamber 75 is separated from the pressure accumulator and connected with the return line by switching inlet valve 76 and outlet valve 77, the brake pressure acting on front surface 81 of sleeve 71 displaces sleeve 71 into bore 70 and separating valve 79, 80 closes. If the pressure in section 82 of the brake line connected with the wheel brake cylinder has expanded sufficiently outlet valve 77 and inlet valve 76 subsequently return into their rest position, and the accumulator pressure in annular chamber 75 brings sleeve 71 into its initial position. As a consequence closing member 79 is again lifted from its seat 80. With this arrangement the separating valve has a small closing distance so that upon a volume-increasing movement of sleeve 71 and separating valve 79, 80 the volume of the pressure medium sucked through during the closing action of separating valve 79, 80 is low, i.e., the pedal distance does not increase, and no pressure peak in section 82 of the brake line connected with the wheel brake cylinder comes up upon the return of sleeve 71 into its initial position.

If the accumulator pressure breaks down the pre-stressed spring displaces push rod 72 within sleeve 71 in direction of separating valve 79, 80 via pressure plate 73. Push rod 72 engages sleeve 71 at the radially inwards pointing collar 78 by its annular surface formed by projection 83 and opens the separating valve by projection 78 extending through the aperture left by collar 78. Separating valve 79, 80 is, thus, kept open and sleeve 71 is kept in its initial position so that the function of the brake system as such as safeguarded inspite of the break-down of the control. Due to the inventive structure of the plunger unit separating valve 79, 80 is given a bigger opening upon a break-down of the accumulator pressure so that occurring tolerances are covered, and separating valves 79, 80 of all brake lines are safely kept open in case of emergency by projection 83 of push rod 72 projecting through collar 78.

The inventive arrangement is very compact by the use of one emergency spring only for several hydraulically controlled plunger units of an antiskid control system. By arranging the pressure medium accumulator in the interior of the device, a separate accumulator can be dispensed with and after a flanging of a pump driven by an electric motor all hydraulic components of the antiskid control system can be combined in one device. The device operates reliably, and the brake system as such is secured against a breakdown of the pump or the accumulator pressure. The production costs are lower for such a compact device in which all required plungers for the all-wheel control can be located, e.g., six plungers in a two-circuit brake system with two-circuit braked front axle, as compared with individual housing for each individual plunger units having a return and emergency spring.

In the arrangement for antiskid control systems as described above only one emergency spring is used very advantageously for several plunger units. This implies that with normal functioning of the device this emergency spring is kept at a distance by a pressure retaining piston. A special advantage of the inventive embodiment is that this pressure retaining piston, which is necessary anyway, is an accumulator piston at the same time; i.e., the pressure accumulator is integrated in the device. Thus, an accumulator arranged separately and which would have to be under spring force can be dispensed with completely.

The described arrangement is especially well suited for the integration of further components necessary in the antiskid control circuit, such as motor, pump, solenoid valves, filter etc. to provide a compact aggregate. The solenoid valves required for every plunger unit can, e.g., — as the plunger unit —, be arranged in an annular area in the housing expanded accordingly. The safety of the whole device is increased substantially by the integrated method of construction, since the screwed pipe connections and bores in the housing replace the connecting lines necessary with individual components, said connecting lines being susceptible to leakages and other disturbances and besides make the assembly difficult and time-consuming.

While we have described above the principles of our invention in connection with specific apparatus it is to be clearly understood that this description is made only by way of example and not as a limitation to the scope of our invention as set forth in the objects thereof and in the accompanying claims.

We claim:

1. In an antiskid control system having an electronic control arrangement responsive to vehicle wheel speed to produce a first control value indicative of wheel skid and a further control value indicative of a given reacceleration of vehicle wheels, a control valve arrangement comprising:
   a plurality of wheel brake cylinders;
   a plurality of separating valves, each of said separating valves being disposed between said master cylinder and an associated one of said wheel brake cylinders;
   first means coupled to each of said separating valves to provide a primary control force for each of said separating valves, said primary control force normally holding each of said separating valves in their open position, said first control value interrupting said primary control force causing each of said separating valves to close and thereby interrupt a hydraulic connection between said master cylinder and the associated one of said wheel brake cylinders, and said further control value reapplying said primary control force causing each of said separating valves to open and thereby reestablish said hydraulic connection between said master cylinder and the associated one of said wheel brake cylinders;
   a plurality of second means in a predetermined association with said first means, each of said second means being associated with a different one of said separating valves to enable volume expansion of the pressure medium in the associated one of said wheel brake cylinders when said separating valves are closed to enable reacceleration of said vehicle wheels;
   a single housing having said plurality of separating valves and said plurality of second means disposed therein compactly; and
   a single auxiliary force source disposed in said housing in a cooperative association with and common to each of said separating valves to maintain each of said separating valves in their open position upon failure of said primary control force.

2. An arrangement according to claim 1, wherein said auxiliary force source provides a purely mechanical association with each of said separating valves.

3. An arrangement according to claim 2, wherein said auxiliary force source includes
   a spring-loaded component held in its retracted position by said primary control force; and
   each of said second means includes
   a push rod having one end thereof mechanically engaging the associated one of said separating valves and the other end thereof facing the front surface of said spring-loaded component.

4. An arrangement according to claim 3, wherein said housing includes
   an axially extending projection having an axially disposed cylindrical recess therein, and
   an accumulator piston disposed in a sealed, displaceable relationship with said recess; and
   said spring-loaded component includes
   a spring-loaded sleeve slidable on the outer surface of said projection, said spring-loaded sleeve having a wall transverse of the axis of said housing supporting one end of said accumulator piston.

5. An arrangement according to claim 4, wherein said recess confined in one direction by said accumulator piston is a pressure accumulator; and
further including
   a motor; and
   a pump driven by said motor connected to said pressure accumulator.

6. An arrangement according to claim 5, further including
   third means coupled to said motor and in association with said accumulator piston to control said motor in response to the position of said accumulator piston.

7. An arrangement according to claim 6, wherein said spring-loaded component further includes
   a cup-shaped spring-pot disposed coaxially of the axis of said housing surrounding said spring-loaded sleeve, said spring-pot having the open end thereof secured to said housing, and
   a first spring surrounding said spring-loaded sleeve, one end of said first spring being supported by the bottom of said spring-pot and the other end of said first spring being supported on a radially, outward extending collar of said spring-loaded sleeve spaced from the bottom of said spring-pot.

8. An arrangement according to claim 7, wherein each of said separating valves and the associated one of said second means are disposed in an annular area of said housing spaced from the axis of said housing and said projection.

9. An arrangement according to claim 8, wherein said annular area includes
   a plurality of bores disposed parallel to the axis of said housing, each of said bores being coupled to said master cylinder and a different one of said plurality of wheel brake cylinders and each of said bores receives a different one of said second means in a slidably sealed relationship.

10. An arrangement according to claim 9, wherein each of said separating valves is disposed in a different one of said bores to control said hydraulic connection between said master cylinder and an associated one of said wheel brake cylinders.

11. An arrangement according to claim 10, wherein each of said separating valves is operable by a different one of said second means.

12. An arrangement according to claim 11, wherein each of said second means includes
a stepped piston.

13. An arrangement according to claim 12, wherein each of said second means is bipartite.

14. An arrangement according to claim 13, wherein each of said second means includes
a push rod extending through the associated one of said bores and actuating the associated one of said separating valves, and
a first sleeve surrounding said push rod, said first sleeve being slidably sealed to the inner surface of said associated one of said bores and said push rod.

15. An arrangement according to claim 14, wherein each of said bores includes
an abutment on the inner wall thereof to confine the relative movement of said first sleeve and said push rod in one direction.

16. An arrangement according to claim 15, wherein each of said push rods includes
a collar extending radially outward therefrom to engage a step in the associated one of said first sleeves.

17. An arrangement according to claim 16, wherein each of said second means further includes
a second sleeve abutting an end of the associated one of said first sleeves spaced from the associated one of said separating valves and surrounding the associated one of said push rods with play.

18. An arrangement according to claim 17, wherein each of said second sleeves has its outer surface stepped and is slidably sealed with the inner surface of the associated one of said bores, the stepped portion of each of said second sleeves and the inner surface of the associated one of said bores forming an elongated annular chamber.

19. An arrangement according to claim 18, further including
a plurality of electromagnetically controlled inlet valves opened in rest position, each of said inlet valves being coupled to a different one of said annular chambers and in common to said pump and said pressure accumulator, each of said inlet valves being controlled by said first and further control values.

20. An arrangement according to claim 19, further including
a reservoir;
a return hydraulic line coupled to said reservoir; and
a plurality of electromagnetically controlled outlet valves closed in rest position, each of said outlet valves being coupled to a different one of said annular chambers and in common to said return line, each of said outlet valves being controlled by said first and further control values.

21. An arrangement according to claim 20, wherein each of said push rods extends a small amount from its associated one of said bores toward said collar of said spring-loaded sleeve in rest position of said arrangement.

22. An arrangement according to claim 13, wherein each of said second means includes
a sleeve sealed to the inner surface of an associated one of said bores, each of said bores having a radially inwardly extending member, and
a push rod longer than said sleeve slidably sealed to said sleeve and said inwardly extending member and having one end thereof extending outside said associated one of said bores, said one end of said push rod engaging said spring-loaded component.

23. An arrangement according to claim 22, wherein each of said second means further includes
an annular chamber formed by the outer surface of said push rod, said inwardly extending member, the adjacent end of said sleeve and the inner wall of said bore, said annular chamber being connectable to said pressure accumulator by an electromagnetically controlled inlet valve and to a return line by an electromagnetically controlled outlet valve.

24. An arrangement according to claim 23, wherein the end of each of said push rods disposed within the associated one of said sleeves is actuable by brake pressure from said master cylinder.

25. An arrangement according to claim 24, wherein each of said sleeves include
a radially inward extending collar on the end thereof adjacent the associated one of said separating valve, said collar having a central opening therethrough; and
each of said push rods include
a central projection on the end thereof with the associated one of said sleeves, said central projection extending through said central opening of said collar to hold the associated one of said separating valves open upon failure of said primary control force.

26. An arrangement according to claim 25, wherein each of said separating valves abut said collar of an associated one of said sleeves, said adjacent end of said sleeve being under said primary control force; and further including
a second spring to prestress each of said separating valves and said associated one of said sleeves against said primary control force so that each of said separating valves is kept open with a small closing distance by the associated one of said sleeves.

27. An arrangement according to claim 26, wherein upon failure of said primary control force said second spring is overcome by said first spring.

28. An arrangement according to claim 1, wherein said auxiliary force source provides a hydraulically operating auxiliary force upon failure of said primary control force.

29. An arrangement according to claim 28, wherein said housing includes
an axially extending projection having an axial outwardly stepped cylindrical recess therein,
a central piston disposed in a sealed slidable relationship with the smaller diameter portion of said recess, and
an annular piston disposed in a sealed slidable relationship with the inner surface of the larger diameter portion of said recess and the outer surface of said central piston, the outer surface of said solid piston, the inner surface of the larger diameter portion of said recess, said step and the end of said annular piston adjacent said step forming an annular chamber, said central piston having inward step adjacent the end thereof spaced from the smaller diameter portion of said recess, said annular piston having an inwardly extending first collar at its free end to engage said inward step of said central piston and an annular groove in the outer surface thereof; and said auxiliary force source includes a spring-loaded sleeve slidable on the outer surface of said projection, said sleeve having a radially inward extending second collar engaging said annular groove of said annular piston.

30. An arrangement according to claim 29, wherein said auxiliary force source further includes a spring-pot disposed coaxially of the axis of said housing surrounding said spring-loaded sleeve, said spring-pot having a bottom transverse wall and a radial inwardly extending flange secured to said housing, and a spring surrounding said spring-loaded sleeve, one end of said spring being supported by said bottom wall and the other end of said spring being supported on a radially, outward extending collar of said spring-loaded sleeve spaced from said bottom wall.

31. An arrangement according to claim 30, wherein said annular chamber is a pressure accumulator; and further including a motor; and a pump driven by said motor connected to said pressure accumulator.

32. An arrangement according to claim 31, further including third means coupled to said motor and in association with said annular piston to control said motor in response to the position of said annular piston.

33. An arrangement according to claim 32, wherein each of said second means includes a bore disposed in said housing, a plunger slidably sealed to the inner surface of said bore, and a counter piston normally spaced from said plunger slidably sealed to the inner surface of said bore.

34. An arrangement according to claim 33, further including an inlet valve opened in rest position connecting said pump and said pressure accumulator to a first space between said plunger, said counter piston and the inner surface of said bore;

a reservoir;

a return line connected to said reservoir; and an output valve closed in rest position connecting said first space to said return line.

35. An arrangement according to claim 34, further including a first chamber formed by one end surface of said plunger and one closed end of said bore, said first chamber being connected to said master cylinder and an associated one of said wheel brake cylinders; and wherein an associated one of said separating valves is disposed in said first chamber to control the hydraulic connection between said master cylinder and said associated one of said wheel brake cylinders.

36. An arrangement according to claim 35, wherein said associated one of said separating valves is operable by said plunger.

37. An arrangement according to claim 36, further including a second chamber formed by one end surface of said counter piston and the other closed end of said bore, said second chamber being connected to a second space in said smaller diameter portion of said recess confined by said central piston.

38. An arrangement according to claim 37, further including a small chamber disposed in said housing connected to said second space, and a seat valve disposed in said small chamber closing in the direction of said second space.

39. An arrangement according to claim 38, further including a non-return valve connecting said small chamber in common to said first chamber of each of said second means.

40. An arrangement according to claim 39, wherein said seat valve is actuated by pressure medium from said master cylinder.

41. An arrangement according to claim 40, wherein said bore of each of said second means are disposed in parallel in said housing and in a vertical relationship to the axis of said housing.

42. An arrangement according to claim 41, wherein each of said inlet valves and each of said outlet valves are controlled by said first and further control values.

43. An arrangement according to claim 42, wherein each of said inlet valves and each of said outlet valves are controllable electromagnetically by said first and further control values.

* * * * *